(12) United States Patent
Shan

(10) Patent No.: US 10,871,571 B2
(45) Date of Patent: Dec. 22, 2020

(54) SYSTEM AND METHOD OF VEHICLE-TRACKING AND LOCALIZATION WITH A DISTRIBUTED SENSOR NETWORK

(71) Applicant: Tiejun Shan, Plano, TX (US)

(72) Inventor: Tiejun Shan, Plano, TX (US)

(73) Assignee: THE EUCLIDE 2012 INVESTMENT TRUST, Plano, TX (US)

( * ) Notice: Subject to any disclaimer, the term of this patent is extended or adjusted under 35 U.S.C. 154(b) by 0 days.

(21) Appl. No.: 16/672,417

(22) Filed: Nov. 1, 2019

(65) Prior Publication Data

US 2020/0064488 A1    Feb. 27, 2020

Related U.S. Application Data

(63) Continuation-in-part of application No. 16/248,761, filed on Jan. 15, 2019, and a continuation-in-part of application No. 16/242,958, filed on Jan. 8, 2019, and a continuation-in-part of application No. 16/249,351, filed on Jan. 16, 2019, and a continuation-in-part of application No. 16/252,257, filed on Jan. 18, 2019, and a continuation-in-part of application No. 16/252,377, filed on Jan. 18, 2019, and a continuation-in-part of application No. 16/271,567, filed on Feb. 8, 2019, and a continuation-in-part of application No. 16/276,288, filed on Feb. 14, 2019.

(60) Provisional application No. 62/617,962, filed on Jan. 16, 2018, provisional application No. 62/616,844, filed on Jan. 12, 2018, provisional application No. 62/754,448, filed on Nov. 1, 2018, provisional application No. 62/756,318, filed on Nov. 6, 2018, (Continued)

(51) Int. Cl.
*G01S 19/12*  (2010.01)
*H04W 4/44*  (2018.01)
*H04W 84/18*  (2009.01)

(52) U.S. Cl.
CPC .............. *G01S 19/12* (2013.01); *H04W 4/44* (2018.02); *H04W 84/18* (2013.01)

(58) Field of Classification Search
CPC ...... G01S 19/12; G01S 5/0027; G01S 5/0054; G01S 5/12; H04W 4/44; H04W 84/18; H04W 4/46; H04W 4/027; H04W 4/90; H04W 4/029; G08G 1/00; H04L 67/26; H04L 67/303
USPC ........................................................ 342/107
See application file for complete search history.

(56) References Cited

U.S. PATENT DOCUMENTS

| 2007/0153731 | A1* | 7/2007 | Fine ....................... H04B 17/24 370/329 |
| 2019/0124603 | A1* | 4/2019 | Larsson ............... H04W 52/325 |
| 2019/0364492 | A1* | 11/2019 | Azizi .................... H04W 4/029 |

\* cited by examiner

*Primary Examiner* — Bo Fan

(57) ABSTRACT

A system and method for vehicle-tracking and localization with a distributed sensor network is provided that includes a plurality of cellular station. A pilot signal is received from the vehicle with an arbitrary station. The pilot signal is compared to each vehicle profile with the arbitrary station in order to identify a matching profile. Spatial positioning data is received for the vehicle with the arbitrary station. The vehicle profile and the spatial positioning data is relayed from the arbitrary station to the at least one proximal station from the plurality of cellular stations. A plurality of iterations is executed. The spatial positioning data is compiled from each iteration into a predicted path for the vehicle with the cellular stations. A warning notification is sent from the arbitrary station of the current iteration to the vehicle, if the predicted path is intersected by at least one hazard.

14 Claims, 17 Drawing Sheets

Related U.S. Application Data provisional application No. 62/617,723, filed on Jan. 16, 2018, provisional application No. 62/618,735, filed on Jan. 18, 2018, provisional application No. 62/619,204, filed on Jan. 19, 2018, provisional application No. 62/628,436, filed on Feb. 9, 2018, provisional application No. 62/630,416, filed on Feb. 14, 2018.

(A) Providing a plurality of cellular stations, wherein the plurality of cellular stations is distributed along at least one road and is communicably coupled to each other, and wherein a plurality of vehicle profiles and a plurality of road hazards are stored on each cellular station, and wherein at least one vehicle is driving along the road (B) Receiving a pilot signal from the vehicle with an arbitrary station, wherein the arbitrary station is any station from the plurality of cellular stations (C) Comparing the pilot signal to each vehicle profile with the arbitrary station in order to identify a matching profile from the plurality of vehicle profiles (D) Receiving spatial positioning data for the vehicle with the arbitrary station (E) Relaying the vehicle profile and the spatial positioning data from the arbitrary station to at least one proximal station from the plurality of cellular stations, wherein the proximal station is geospatially closer to the arbitrary station than remaining stations from the plurality of cellular stations

SYSTEM AND METHOD OF VEHICLE-TRACKING AND LOCALIZATION WITH A DISTRIBUTED SENSOR NETWORK

The current application claims a priority to the U.S. Provisional Patent application Ser. No. 62/754,448 filed on Nov. 1, 2018.

The current application also claims a priority to a U.S. non-provisional application Ser. No. 16/276,288 filed on Feb. 14, 2019. The U.S. non-provisional application Ser. No. 16/276,288 claims a priority to the U.S. Provisional Patent application Ser. No. 62/630,416 filed on Feb. 14, 2018.

The current application also claims a priority to a U.S. non-provisional application Ser. No. 16/271,567 filed on Feb. 8, 2019. The U.S. non-provisional application Ser. No. 16/271,567 claims a priority to the U.S. Provisional Patent application Ser. No. 62/628,436 filed on Feb. 9, 2018.

The current application also claims a priority to a U.S. non-provisional application Ser. No. 16/252,377 filed on Jan. 18, 2019. The U.S. non-provisional application Ser. No. 16/252,377 claims a priority to the U.S. Provisional Patent application Ser. No. 62/619,204 filed on Jan. 19, 2018.

The current application also claims a priority to a U.S. non-provisional application Ser. No. 16/252,257 filed on Jan. 18, 2019. The U.S. non-provisional application Ser. No. 16/252,257 claims a priority to the U.S. Provisional Patent application Ser. No. 62/618,735 filed on Jan. 18, 2018.

The current application also claims a priority to a U.S. non-provisional application Ser. No. 16/249,351 filed on Jan. 16, 2019. The U.S. non-provisional application Ser. No. 16/249,351 claims a priority to a U.S. provisional application Ser. No. 62/617,723 filed on Jan. 16, 2018.

The current application also claims a priority to a U.S. non-provisional application Ser. No. 16/248,761 filed on Jan. 15, 2019. The U.S. non-provisional application Ser. No. 16/248,761 claims a priority to a U.S. provisional application Ser. No. 62/617,962 filed on Jan. 16, 2018.

FIELD OF THE INVENTION

The present invention relates generally to a target location approximation system based upon time domain subspace signals and spatial domain subspace signals. More specifically, the present invention relates generally to a distributed sensor network for autonomous driving vehicles. By utilizing high-resolution subspace signals the overall accuracy of location approximation is improved.

BACKGROUND OF THE INVENTION

Vehicle wireless communication network and auto radar for automatic diving vehicle has been a fast-growing area of interest for many automobile and wireless enterprises. These markets are among fast growing markets in the world. Recently, the development of auto mobile radar provides a sensing tool for advanced driver-assistance systems (ADAS) and automatic driving that is the focus of automobile manufacture and Artificial Intelligent (AI) research and development industry. Vehicular communication network $V_2X$ is a driving force for 5G, 4G-LTE and Wi-Fi Wi-Gig mobile communication standards, product developments and applications. MIMO Antenna Array is very powerful technology for $V_2X$ communication system, and vehicular radar system for automatically driving and ADAS. Mobile communication system technology has made a great progress. MIMO antenna array, OFDM modulation become new standards, and Wi-Fi LAN has been on the same track. Passive radar has been a research focus since the 1980's for multiple target localization and tacking. Distributed sensor network technology has been research focus for several decades. With the advent of communication theory, MIMO antenna technology, passive radar and wireless network, it can be a new era of distributed sensor network. For some road geographic location, there would be no direct path for radar and communication signals, therefor the radar echo detection presents a great challenge to estimate the surrounding vehicles location and speed. This is a challenge problem for Lidar as well.

Therefore, this invented new vehicles location detection, speed estimation and tracking would play a key role in making automatic driving a reality. The present invention relates to automatic driving vehicular system. A great concern has arisen with automatically driving vehicles are at the horizon. ADAS system greatly improved the traffic safety, has been widely equipped in vehicles. Radar sensor has been becoming a safety device for automobile, for ADAS sand becomes necessity for automatic driving vehicles. A reliable for all weather, all geographic conditions, vehicular location detection, tracking and speed detection is a key requirement for traffic safety and realization of fully automatic driving vehicles.

BRIEF DESCRIPTION OF THE DRAWINGS

FIG. 8 is a flowchart illustrating the overall process for the method of the present invention.

DETAIL DESCRIPTIONS OF THE INVENTION

All illustrations of the drawings are for the purpose of describing selected versions of the present invention and are not intended to limit the scope of the present invention.

Figure 4:
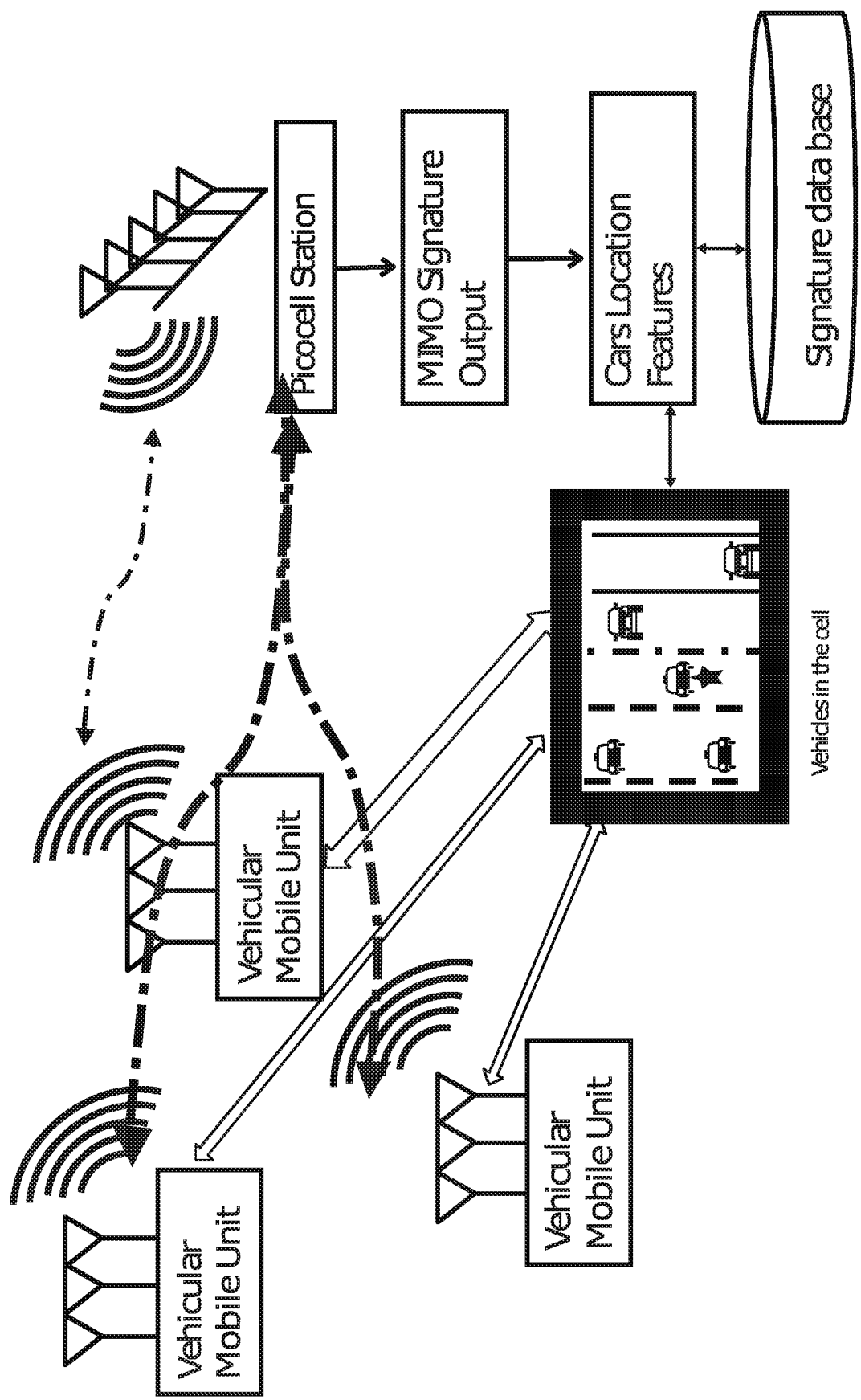
FIG. 4 is an illustration of utilizing the present invention to identify a vehicle among a plurality of other vehicles traveling along the same road.
Figure 5:
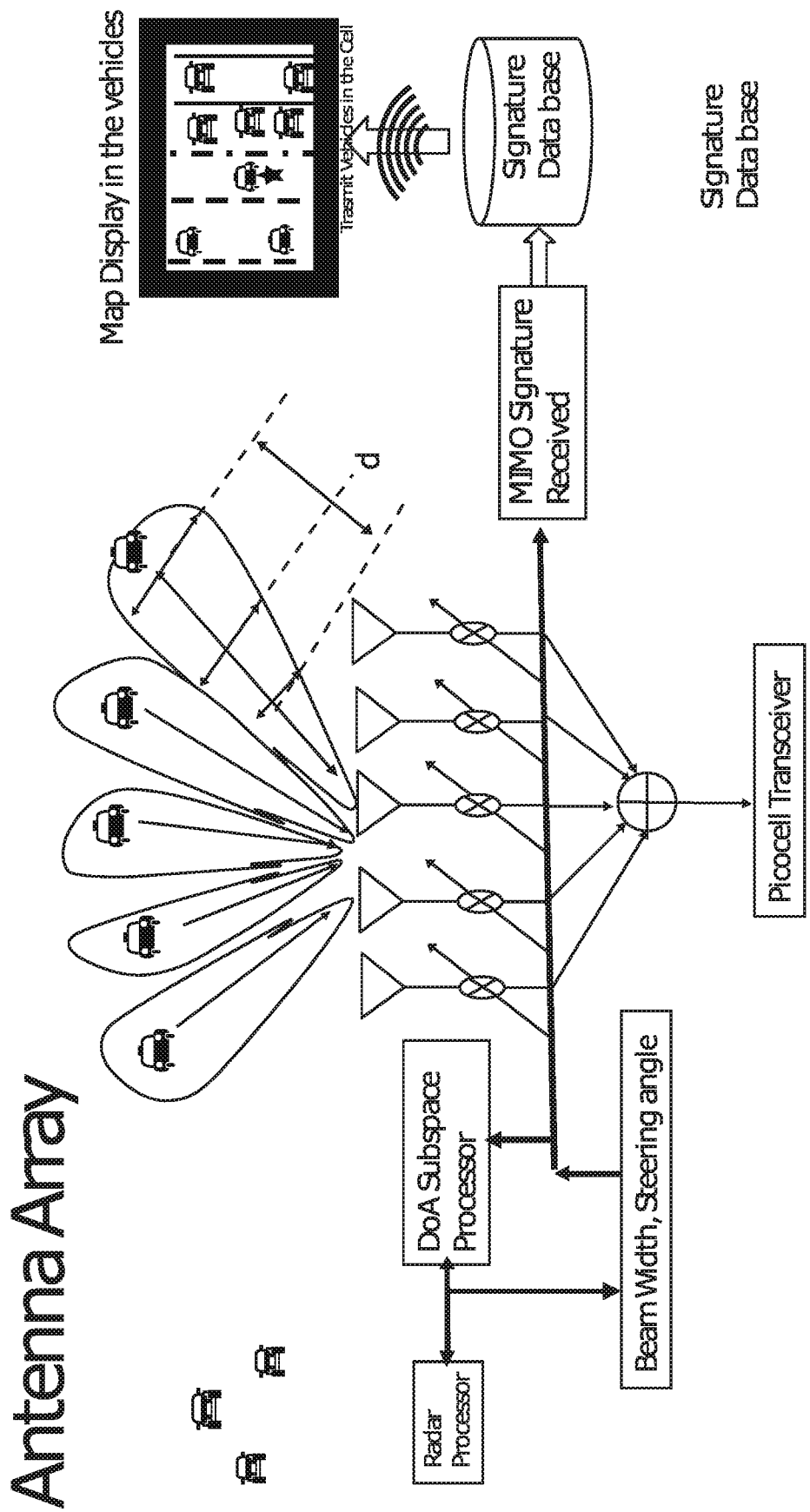
FIG. 5 is an illustration of utilizing the present invention to estimate a direction of arrival (DoA) and time-delay for a plurality of vehicles within a range of each other.

The present invention is a method of vehicle-tracking and localization with a distributed sensor network. The present invention is preferably for reliable automatic driving. In order to implement the system and method of the present invention, the system utilizes communication systems such as third generation (3G) wireless network, fourth generation (4G) wireless network, fifth generation (5G) wireless network, local-area network (LAN), and Wi-Fi to provide vehicle tracking and both location and speed estimation for each vehicle within a given range. More specifically, a cellular station is a node within a cellular communication network while utilizing communication systems such as 3G wireless network, 4G wireless network, and 5G wireless network. Similarly, each cellular station is a node within a local communication network while utilizing communication systems such as LAN and Wi-fi. Furthermore, the present invention utilizes communication systems in order to monitor central traffic control, vehicle condition monitoring, and instantaneous road traffic conditions. The present invention provides a solution for all geometrical road conditions that present a great challenge for auto radar and Lidar detection. As seen in FIG. 4, the tracking of vehicles is possible with the utilization of high-resolution subspace signals to determine the direction of arrival (DoA) and time delay estimation. Moreover, a low latency wireless communication model is implemented with the DoA and time delay estimation in order to optimize accuracy for vehicle localization and speed estimation for real-time vehicle tracking, seen in FIG. 5.

Figure 1:
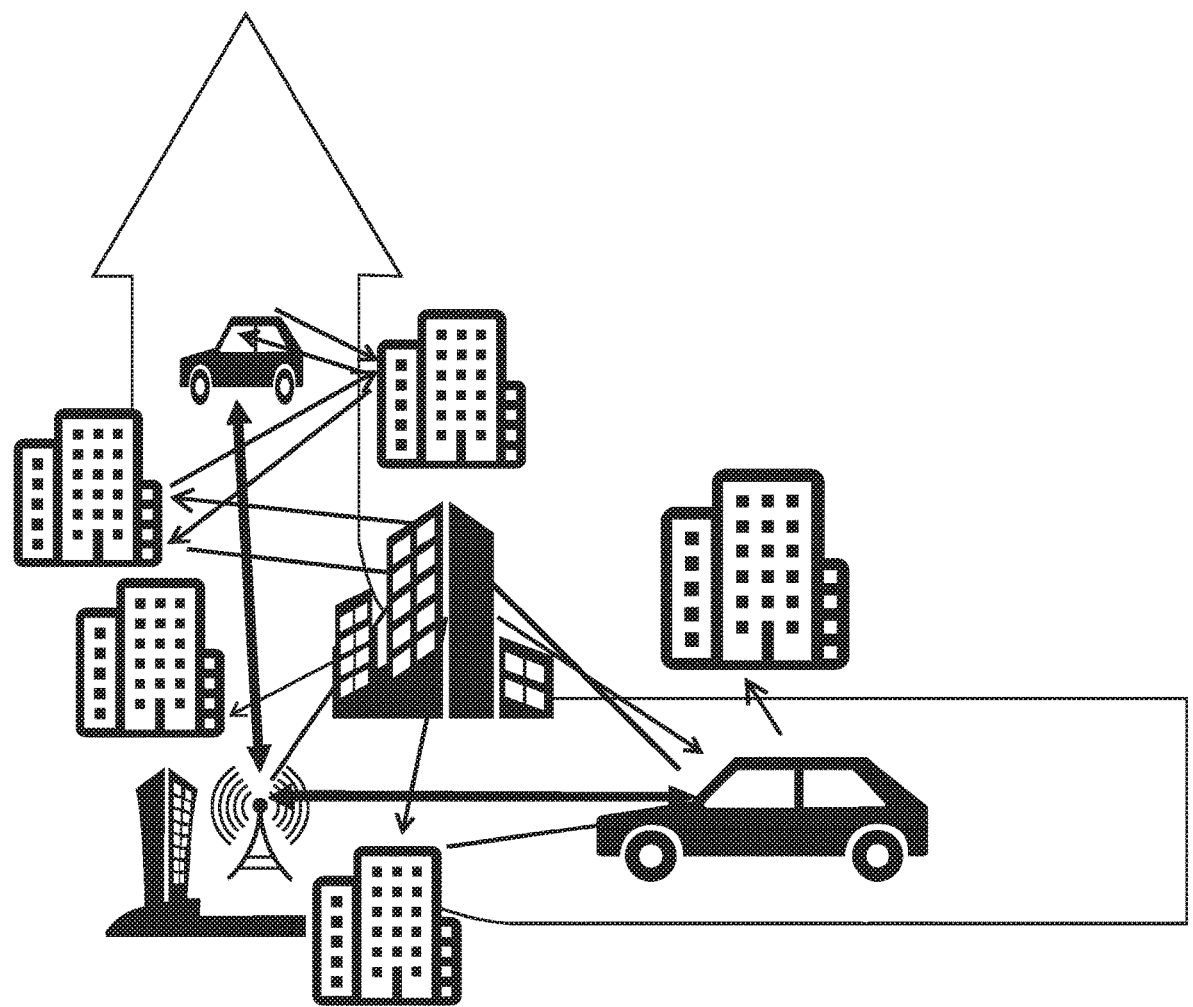
FIG. 1 is an illustration of utilizing the present invention with a road hazard, the road hazard being a sharp turn.
Figure 7:
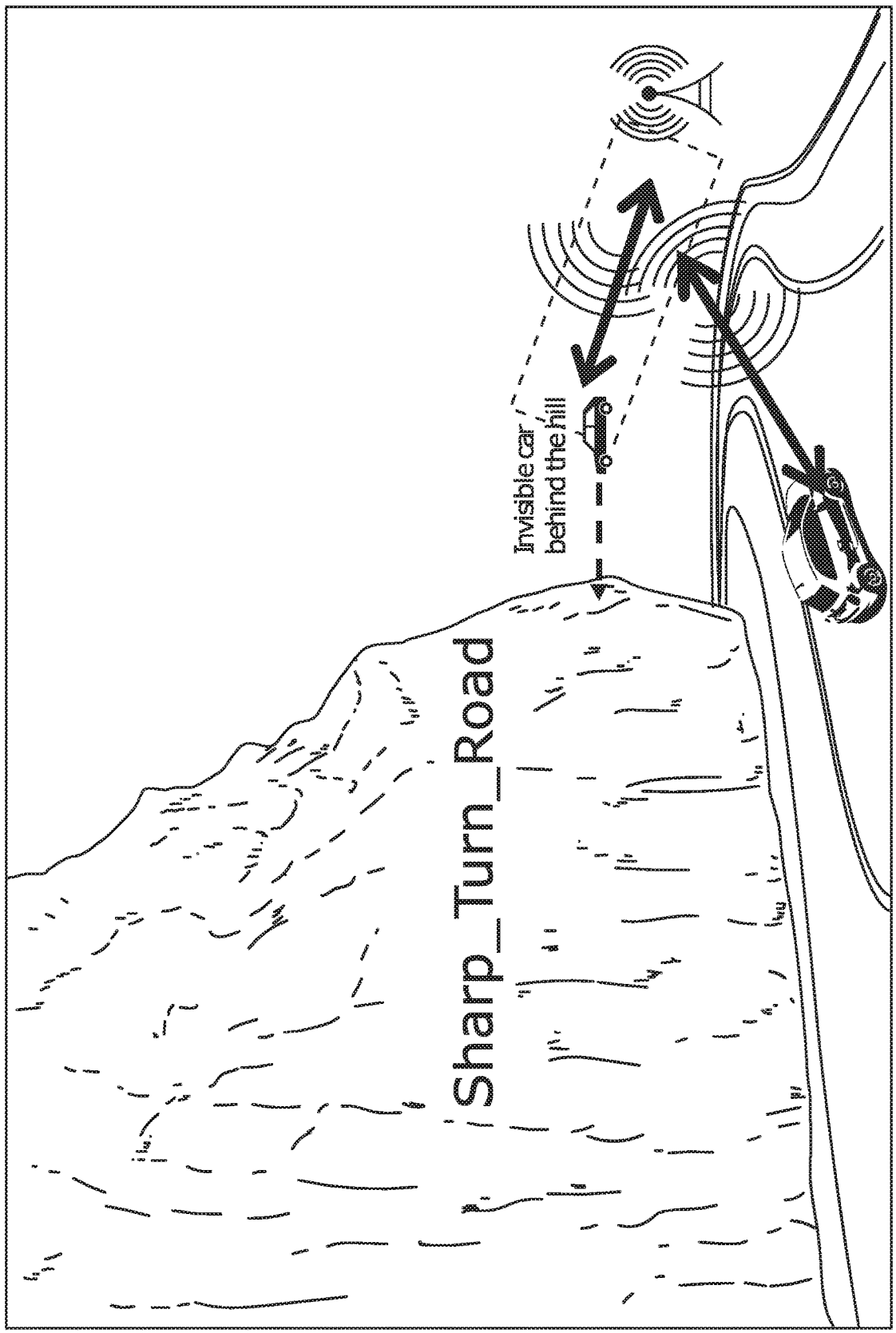
FIG. 7 is an illustration of utilizing the present invention with a road hazard, the road hazard being an urban setting with no clear in-line sight of at least one road.

The physical system used to implement the method for the present invention includes a plurality of cellular stations. The plurality of cellular stations is an access point that receives and delivers signals. The plurality of cellular stations is distributed along at least one road and is communicably coupled to each other. In the preferred embodiment of the present invention, each cellular station is a picocell station. In order to ensure vehicle safety with accurate vehicle detection a detection range of each cellular station ranges from 100 meters to 500 meters. Each of the plurality of cellular stations utilizes a multiple-input and multiple-output (MIMO) antenna to determine road path from a viewing angle. The plurality of cellular stations therefore overcome all road obstacles as a result of winding roads, congested urban environments, and so on where radar waves and signals propagate into no-line-of-sight mode, as seen in FIG. 1 and FIG. 7. In order for vehicles to overcome these obstacles with the present invention, a plurality of vehicle profiles and a plurality of road hazards are stored on each cellular station, wherein at least one vehicle is driving along the road (Step A). Each vehicle profile may include, but is not limited to, a current location, a current speed, a lane identification, and a vehicle identification number (VIN).

Figure 2:
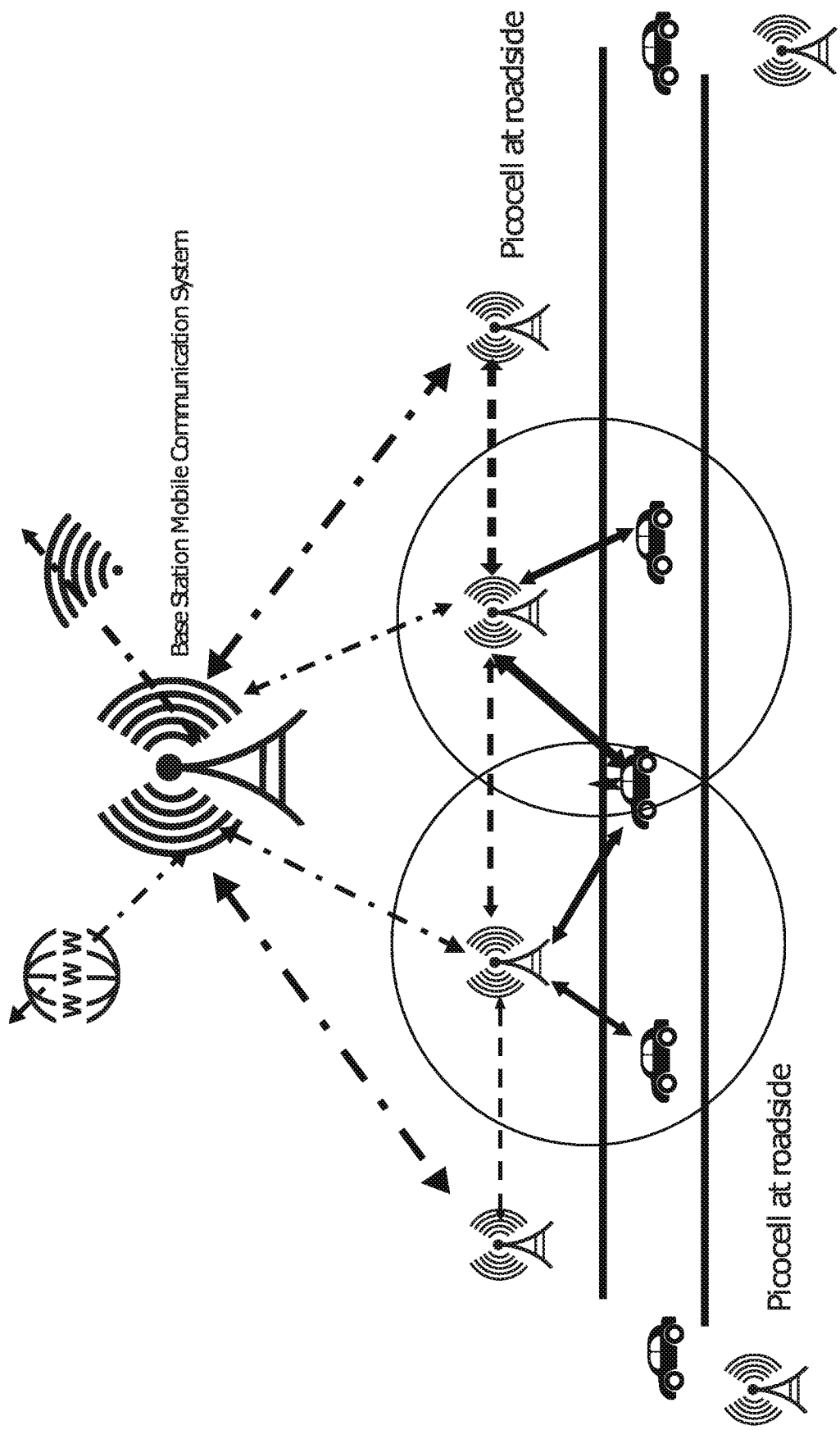
FIG. 2 is an illustration of utilizing the present invention by relaying a vehicle profile and a spatial positioning data of a vehicle from an arbitrary station to at least one proximal station from a plurality of cellular stations in order to provide enough data points for a predicted path for the vehicle.
Figure 9:
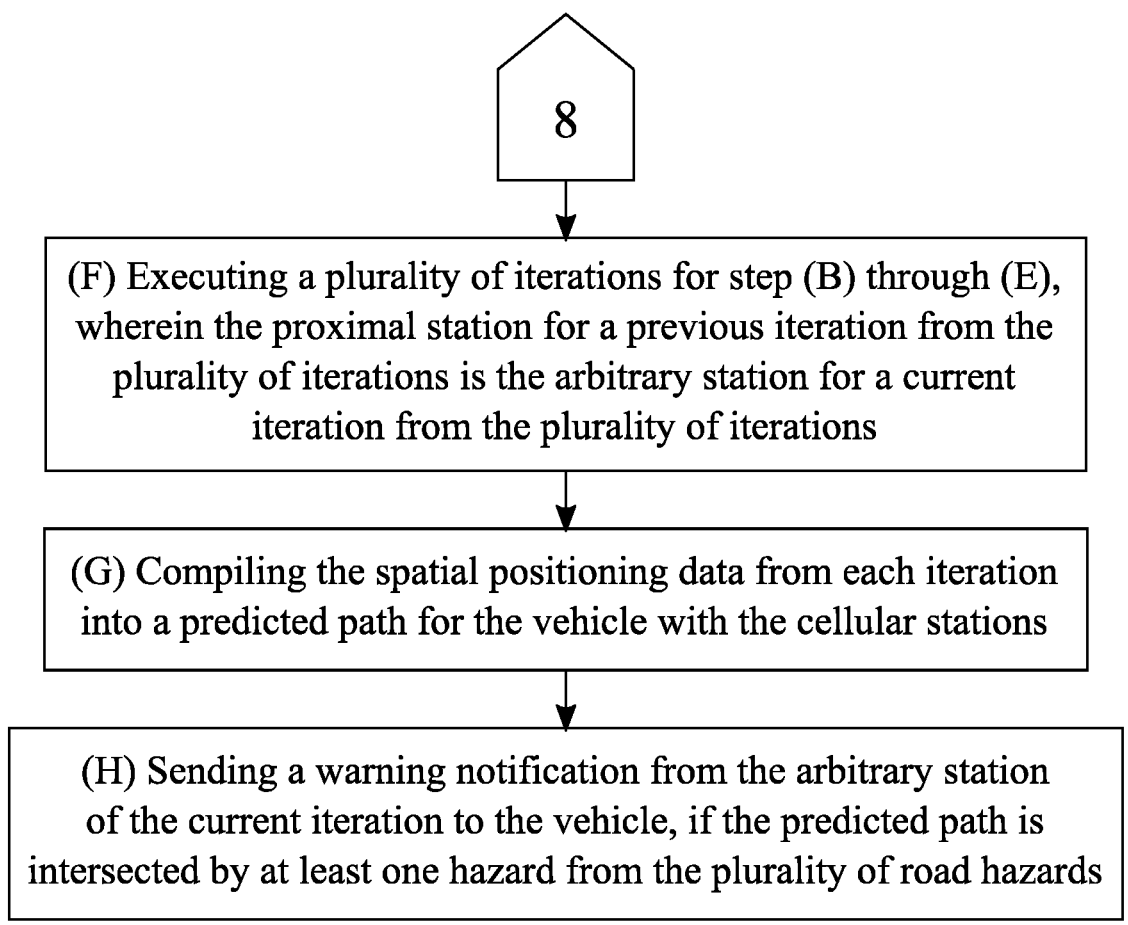
FIG. 9 is continuation of FIG. 8.
Figure 10:
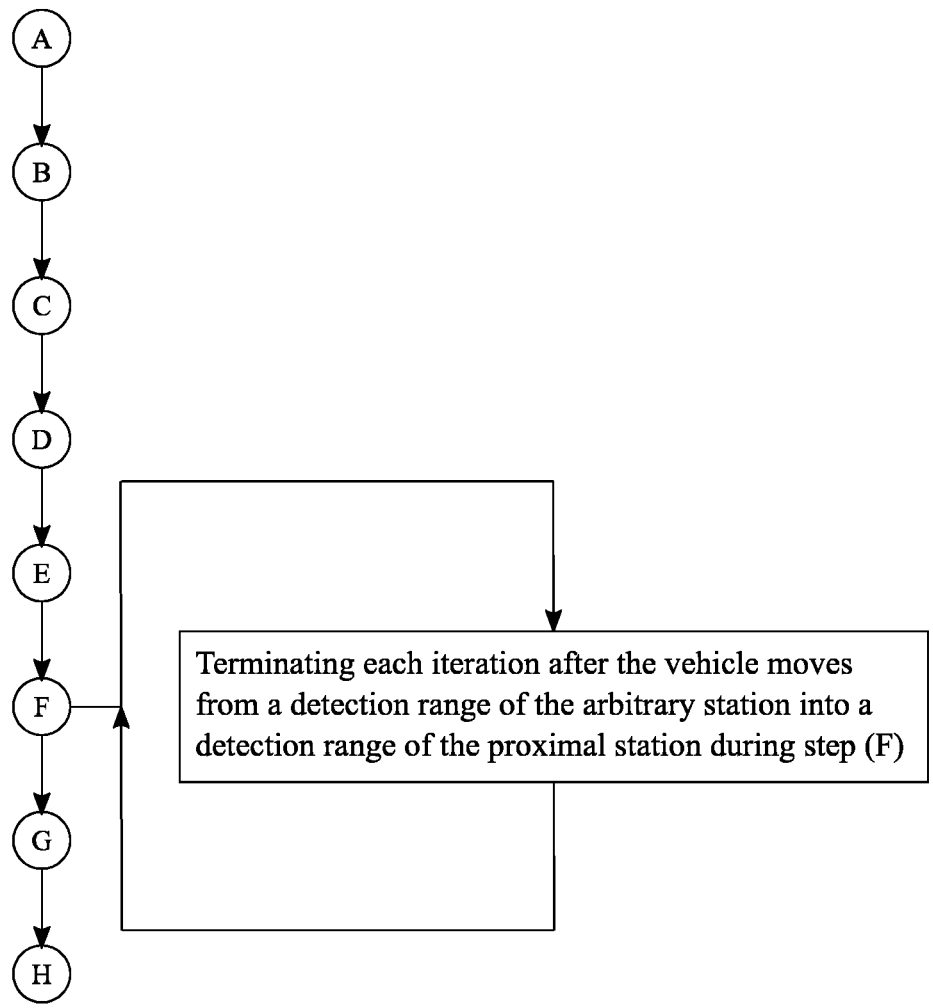
FIG. 10 is a flowchart illustrating the subprocess of terminating an iteration of identifying a vehicle and determining the spatial positioning data and speed for the vehicle once the vehicle is out of a detection range.

The overall process for the present invention, includes the following steps that are implemented with the plurality of cellular stations. As seen in FIG. 8, the overall process begins by receiving a pilot signal from the vehicle with an arbitrary station, wherein the arbitrary station is any station from the plurality of cellular station (Step B). The pilot signal is compared to each vehicle profile with the arbitrary station in order to identify a matching profile from the plurality of vehicle profiles (Step C). Spatial positioning data is received for the vehicle with the arbitrary station (Step D), wherein the spatial positioning data includes a current location and a current speed of the vehicle. The vehicle profile and the spatial positioning data is relayed from the arbitrary station to the at least one proximal station from the plurality of cellular stations, wherein the proximal station is geospatially closer to the arbitrary station than remaining station from the plurality of stations (Step E). The overall process continues, as seen in FIG. 2 and FIG. 9, by executing a plurality of iterations for Steps B through E is executed, wherein the proximal station for a previous iteration from the plurality of iterations is the arbitrary station for a current iteration from the plurality of iterations (Step F). Seen in FIG. 10, each iteration is preferably terminated after the vehicle moves from a detection range of the arbitrary station into a detection range of the proximal station during Step F as the vehicle is out of the detection range of the arbitrary station. The spatial positioning data from each iteration is complied into a predicted path for the vehicle with the cellular stations (Step G). The predicted path projects the path of the vehicle based on the driving habits observed with the spatial positioning data. A warning notification is sent from the arbitrary station of the current iteration to the vehicle, if the predicted path is intersected by at least one hazard from the plurality of road hazards (Step H). The warning notification may be a message or audio alert with the vehicle itself or smart devices wirelessly connected with the vehicle.

Figure 11:
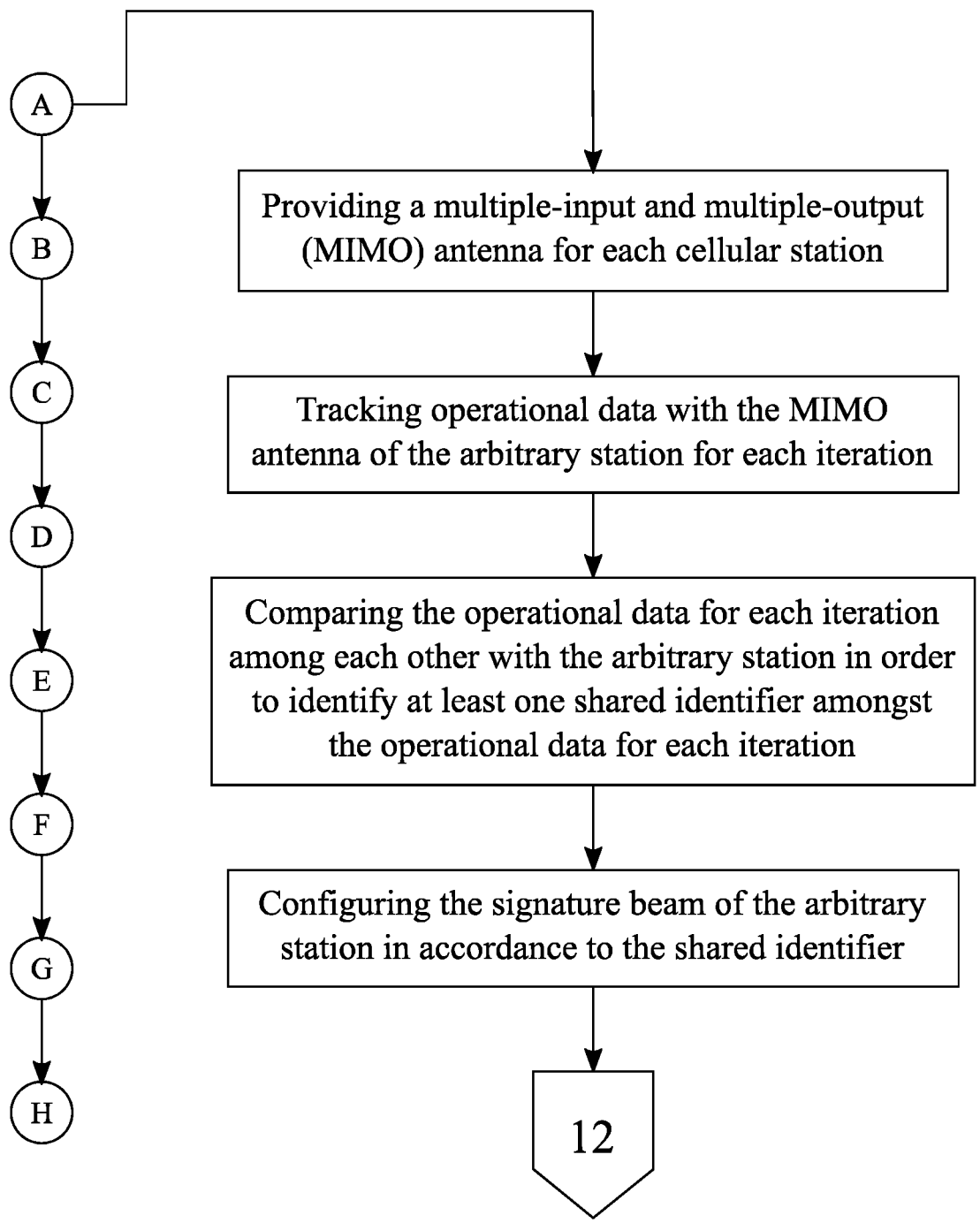
FIG. 11 is a flowchart illustrating the process of determining the spatial positioning data with a DoA and time-delay estimation.
Figure 12:
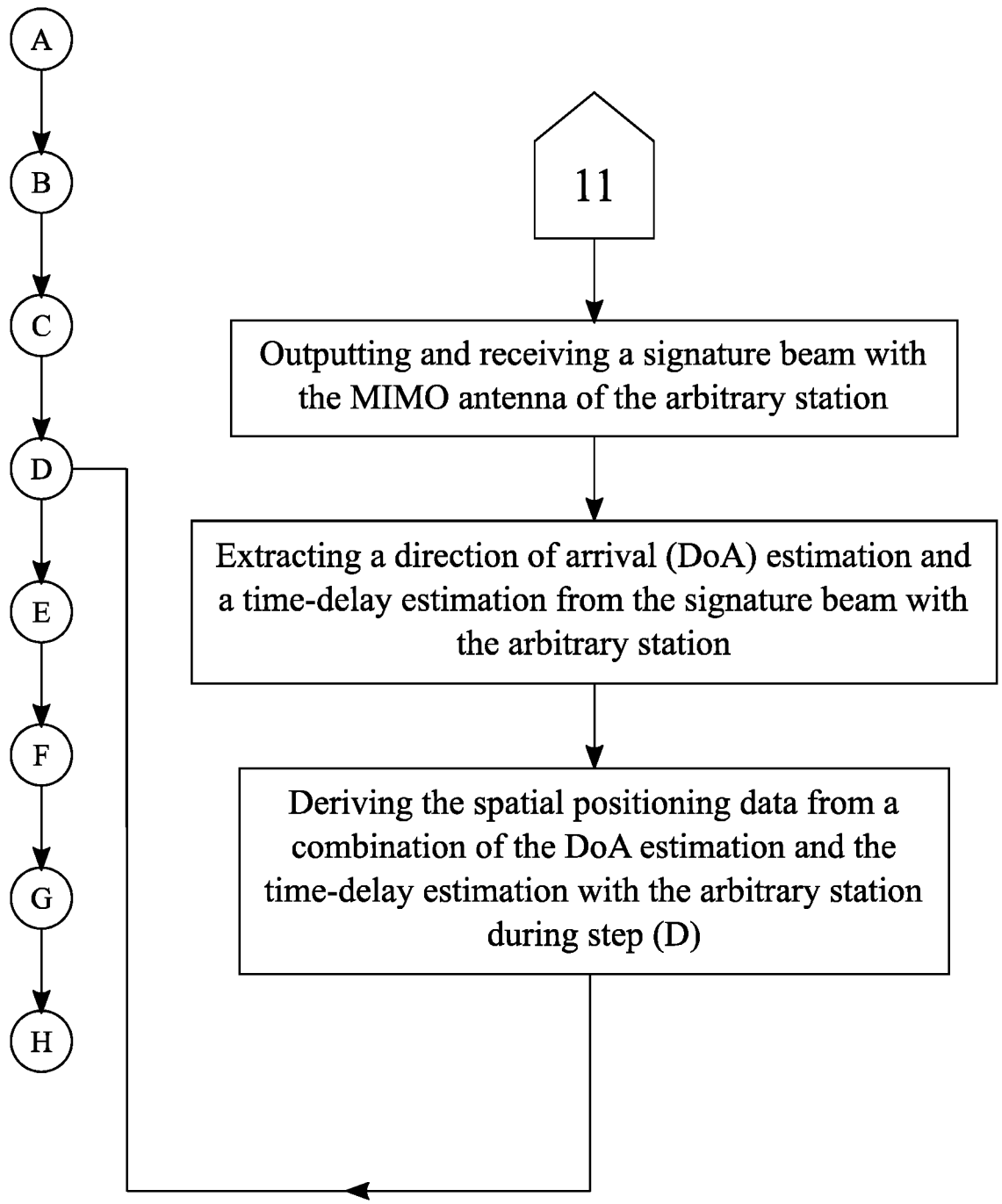
FIG. 12 is a continuation of FIG. 11.

Seen in FIG. 11 and FIG. 12, a multiple-input and multiple-output (MIMO) antenna is provided for each cellular station in order to more accurately estimate the spatial positioning data for the vehicle. A signature beam is outputted and received with the MIMO antenna of the arbitrary station, thereby providing fast identification of the vehicle by each cellular station. The signature beam allows each cellular station to estimate the location of the vehicle. A direction of arrival (DoA) estimation and a time-delay estimation are extracted from the signature beam with the arbitrary station, and the spatial positioning data is derived from a combination of the DoA estimation and the time-delay estimation with the arbitrary station during Step D. The DoA provides a current location of the vehicle and the time-delay estimation accounts for the time the signature beam to reflect towards and return to the cellular station. Each cellular station therefore serves as sample to determine if the vehicle is projected to intersect with at least one road hazard. Moreover, the MIMO antenna effectively serves as a radar in order to determine the DoA of the vehicle.

Each cellular station is able to detect the plurality of road hazards as operational data is tracked with the MIMO antenna of the arbitrary station for each iteration, which can be seen in FIG. 11. The operational data allows for the detection of ambient objects proximal to the road. The operational data is then compared for each iteration among each other with the arbitrary station in order to identify at least one shared identifier amongst the operational data for each iteration. The shared identifier is a common ambient object that is detected in the operational data through multiple iterations. For example, the shared identifier could detect a tree, and, thus, the MIMO antenna of a cellular station can configure their signature beam to continuously accommodate for the tree. Consequently, the signature beam of the arbitrary station is configured in accordance to the shared identifier.

In the process of deriving the DoA, an algorithm is executed with each of the plurality of cellular stations. When the MIMO antenna is an antenna array consisting of M points, and pilot signal in a vector of length M, the algorithm is used to derive the following equation:

$$r_j = \begin{bmatrix} r_j(t_1) \\ r_j(t_2) \\ \vdots \\ r_j(t_M) \end{bmatrix} = \begin{bmatrix} \vdots & \vdots & \vdots & & \vdots \\ \vdots & \vdots & \vdots & & \vdots \\ A(\theta_1) & A(\theta_2) & A(\theta_3) & \ldots & A(\theta_D) \\ \vdots & \vdots & \vdots & & \vdots \\ \vdots & \vdots & \vdots & & \vdots \end{bmatrix} \begin{bmatrix} m_{1j} \\ m_{2j} \\ \vdots \\ \vdots \\ m_{Dj} \end{bmatrix} + \begin{bmatrix} n_j(t_1) \\ n_j(t_2) \\ \vdots \\ \vdots \\ n_j(t_M) \end{bmatrix}$$

Where $r_j$ is the pilot signal of the M element antenna array, $m_j$ is the EM wave vector impinging on the antenna array, n is the white noise of the channel.

Next, the representative eigenvector is used to estimate a maximum eigenvector, wherein the maximum eigenvector is also derived through the algorithm to determine the array direction vector. The maximum eigenvector is defined by:

$$A^T(\Theta) = [s(t_1 - \Theta), s(t_2 - \Theta) \ldots s(t_M - \Theta)]^T$$

when a signal selected from the plurality of pilot signals is represented in a vector format as:

$$r(t) = A[\Theta_{i|i=1,2,\ldots,k}]s(t) + n(t)$$

When the maximum eigenvector is estimated, the present invention proceeds to derive the DoA of the pilot signal by searching a corresponding subspace spanned by the maximum eigenvector. The covariance matrix of a selected signal from the plurality of received signals can be shown as:

$$R = A[\Theta_{i|i=1,2\ldots k}] S A[\Theta_{i|i=1,2\ldots k}]^* + N$$

and the vector used for the DoA of the pilot signal is determined by the zero points in the following equation:

$$\Phi(\theta) = \frac{1}{\sum_{j=1}^{M-D} \|A(\theta) * E_j\|^{\wedge 2}}$$

wherein $\Theta$ represents the search range of the MIMO antenna and $E_j$ represents the $j^{th}$ eigenvector of the covariance matrix.

If the pilot signal consisted of a K-number of signals, the covariance matrix can be represented as:

$$(1/K)\Sigma_{i=1}^{k} r(t_i) r^*(t_i)$$

If a spectral decomposition was performed on the covariance matrix, the following equation can be derived:

$$\hat{R} = \sum_{i=1}^{M} \lambda_i V_i *$$

As a final step of the calculations, the DoA estimate can be determined by plotting the data points according to the following equation which is used to estimate the maximum eigenvector from the representative eigenvector.

$$\Phi(\Theta) = \frac{A*(\theta)A(\theta)}{\sum_{j=1}^{M-D} \|A(\theta) * \overline{E_j}\|^{\wedge 2}}$$

In this instance, $\Theta$ represents the time delay for the $i^{th}$ target that resulted in the selected signal represented above.

Similar to calculating the time delay and the DoA for the pilot signal, the algorithm can also be used to identify the pilot signal of a vehicle among other vehicles. In order to do so, the present invention utilizes the algorithm to derive a likelihood ratio for a set of selected eigenvalues from the representative eigenvector. Next, the quantity for the plurality of vehicles is assessed by performing a sequence of hypotheses tests on the set of selected eigenvalues selected from the representative eigenvector. To do so, the algorithm compares a likelihood ratio for each of the set of selected eigenvalues. By doing so, a quantity of the plurality of vehicles is derived, wherein a specific pilot signal corresponds to a specific vehicle. The likelihood ratio used in the calculation can be represented as:

$$LR(p) = \left\{ \frac{\left[ \prod_1^p \lambda_i \right]^{1/p}}{\left(\frac{1}{p}\right)\sum_1^p \lambda_i} \right\}^{\frac{pK}{2}}$$

A spectral decomposition was performed on the covariance matrix, the following equation can be derived:

$$\hat{R} = \sum_{i=1}^{M} \lambda_i V_i *$$

Wherein, $\lambda_1 \leq \lambda_2 \leq \ldots \leq \lambda_M$.

In the process of calculating the time delay, the plurality of pilot signals is initially represented as a representative eigenvector by executing the each of the cellular stations. Next, the algorithm is applied to estimate a minimum eigenvector from the representative eigenvector so that the time delay between the pilot uplink signal and each of the plurality of pilot signals can be calculated by searching a corresponding subspace derived from the minimum eigenvector. The minimum eigenvector will be orthogonal to a signature vector of each of the plurality of pilot signals. A selected signal from the plurality of pilot signals can be represented through the following equation.

$$r(t) = \sum_{i=1}^{D} m_i s(t - \theta_i) + n(t)$$

$$\Phi(\Theta) = \frac{A*(\theta)A(\theta)}{\|A(\theta) * \widehat{v_1}\|^{\wedge 2}}$$

$$A^T(\Theta) = [s(t_1 - \Theta), s(t_2 - \Theta) \ldots s(t_M - \Theta)]^T$$

To accommodate multiple angles, transmit omnidirectionally, and receive the plurality of overlapping echo signals from varying angles, the MIMO antenna is preferably an antenna array. Each antenna of the antenna array is provided with at least one tapped delay line that allows a signal to be delayed by several samples. When in use, the DoA for each of the plurality of overlapping echo signals is derived through the spatial subspace processor. The maximum of the likelihood ratio can be used to determine the number of vehicles, and with the estimation of the time delay for each pilot signal, the distance of the vehicle, in conjunction with the DoA estimation, the vehicle location, speed, and identification are determined. Therefore, the system includes a radar function in addition to the wireless $V_2X$ communication function.

The Rayleigh quotient can also be used in time delay calculations. When used, the Rayleigh quotient can be defined by the following equation.

$$J(x) = \frac{x^T R x}{x^T x}$$

Utilizing the Rayleigh quotient, the Rayleigh principle can be stated as:

$$\min_x J(x) = \frac{V_1^T R v_1}{V_1^T v_1} = \lambda_1$$

When calculating the time delay using the Rayleigh principle for observations $\{r(i), i=1, \ldots, n\}$, the Rayleigh quotient for the observations can be defined as:

$$\min_x J(x) \text{ subject to } x^T x = 1$$

$$x(k) = \alpha(k)[x(k-1) - P(k)\psi(k)e(k)]$$

$$P(k) = P(k-1) - \frac{P(k-1)\psi(k)\psi^T(k)P(k-1)}{1+\psi^T P(k-1)\psi(k)}$$

$$\psi(k) = r(k) - x(k-1)e(k)$$

$$\alpha(k) = \frac{\|x(k-1)\|}{\|x(k)\|}$$

$$e(k) = \frac{x^T(k-1)r(k)}{\|x(k-1)\|}$$

This algorithm is able to update vector X from vehicle to vehicle, X asymptotically converges to eigenvector $V_1$.

To accommodate the time delay that is not constant due to the varying speeds of each of the plurality of vehicles, a forget factor of X is introduced, and the overall Rayleigh function would change to the following equation:

$$\hat{J}_g(x) = \frac{1}{n}\sum_{i=1}^{n} n\lambda^{n-i} J_i(x) = \frac{1}{n}\sum_{i=1}^{n} \lambda^{n-i} \frac{x^T r_i r_i^T x}{x^T x} = \alpha \frac{x^T \hat{R} x}{x^T x}$$

Thus, the recursive algorithm derived from the Rayleigh principle would change to the following equation:

$$P(k) = \frac{1}{\lambda}\left[\frac{P(k-1) - P(k-1)\psi(k)\psi^T(k)P(k-1)}{\lambda + \psi^T P(k-1)\psi(k)}\right]$$

After further calculations, the minimum eigenvector can be determined as follows:

$$x(k) = \alpha(k)[x(k-1) - P(k)\psi(k)e(k)]$$

$$\psi(k) = r(k) - x(k-1)e(k)$$

$$\alpha(k) = \frac{\|x(k-1)\|}{\|x(k)\|}$$

$$e(k) = \frac{x^T(k-1)r(k)}{\|x(k-1)\|}$$

$$A^T(\theta) = [s(t_1 - \theta), s(t_2 - \theta) \ldots s(t_M - \theta)]^T$$

$$\Phi(\theta) = \frac{A*(\theta)A(\theta)}{\|A(\theta)*\hat{v_1}\|^{\wedge}2}$$

This recursive algorithm provides a powerful and effective target tracking method for the vehicle.

Figure 13:
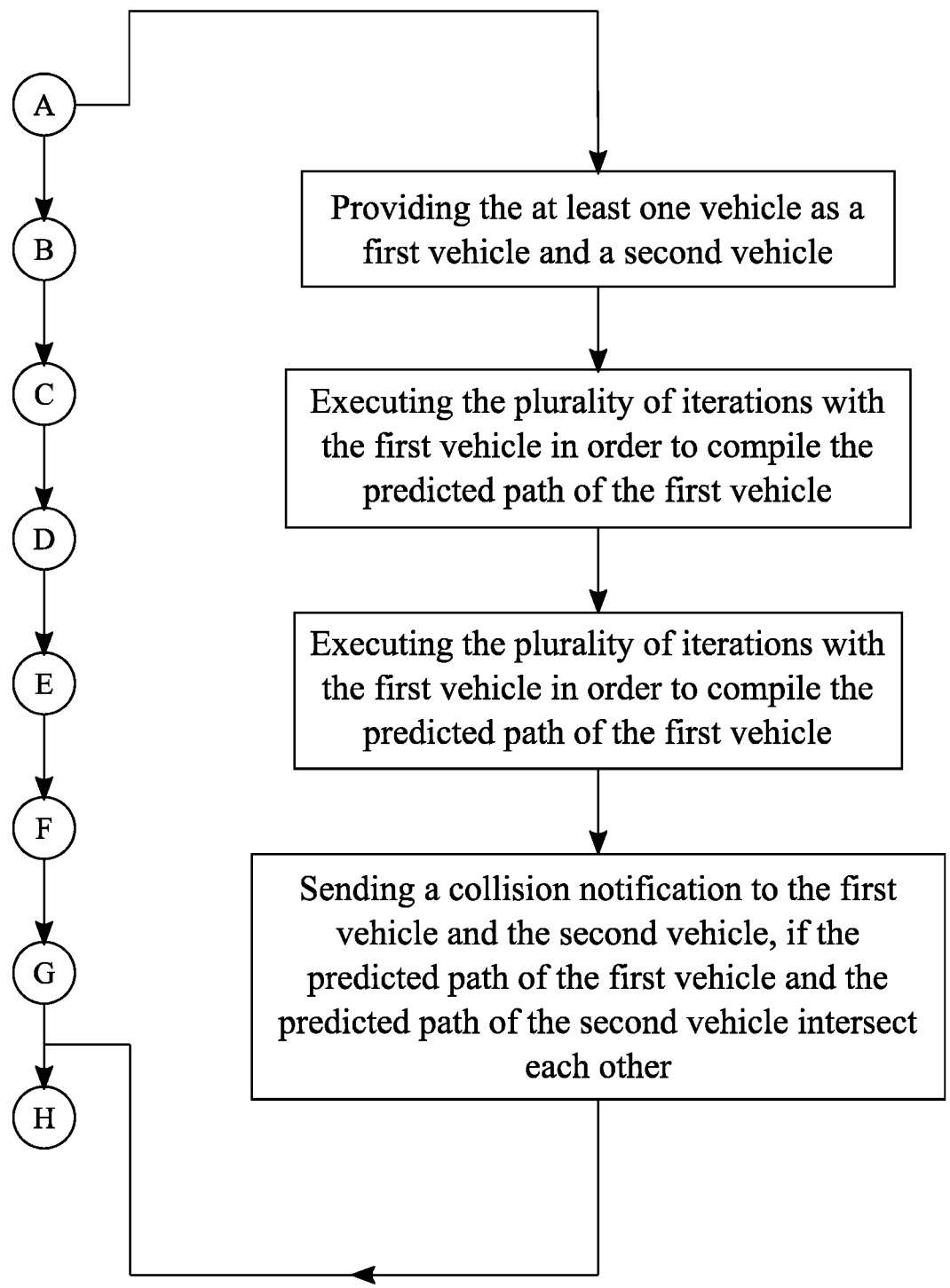
FIG. 13 is a flowchart illustrating the subprocess of alerting a first vehicle and a second vehicle of a collision with each other of the present invention.

In order to protect one driver from another driver, the at least one vehicle is provided as a first vehicle and a second vehicle, seen in FIG. 13. The plurality of iterations is executed with the first vehicle in order to compile the predicted path of the first vehicle, determining the DoA for the first vehicle. Similarly, the plurality of iterations is executed with the second vehicle in order to compile the predicted path of the second vehicle, determining the DoA for the second vehicle. Provided the DoA for the first vehicle and the DoA of the second vehicle, a collision notification is sent to the first vehicle and the second vehicle, if the predicted path of the first vehicle and the predicted path of the second vehicle intersect each other. This intersection may be around a corner or blind spot that the first vehicle and the second vehicle are heading towards from opposite directions.

Figure 3:
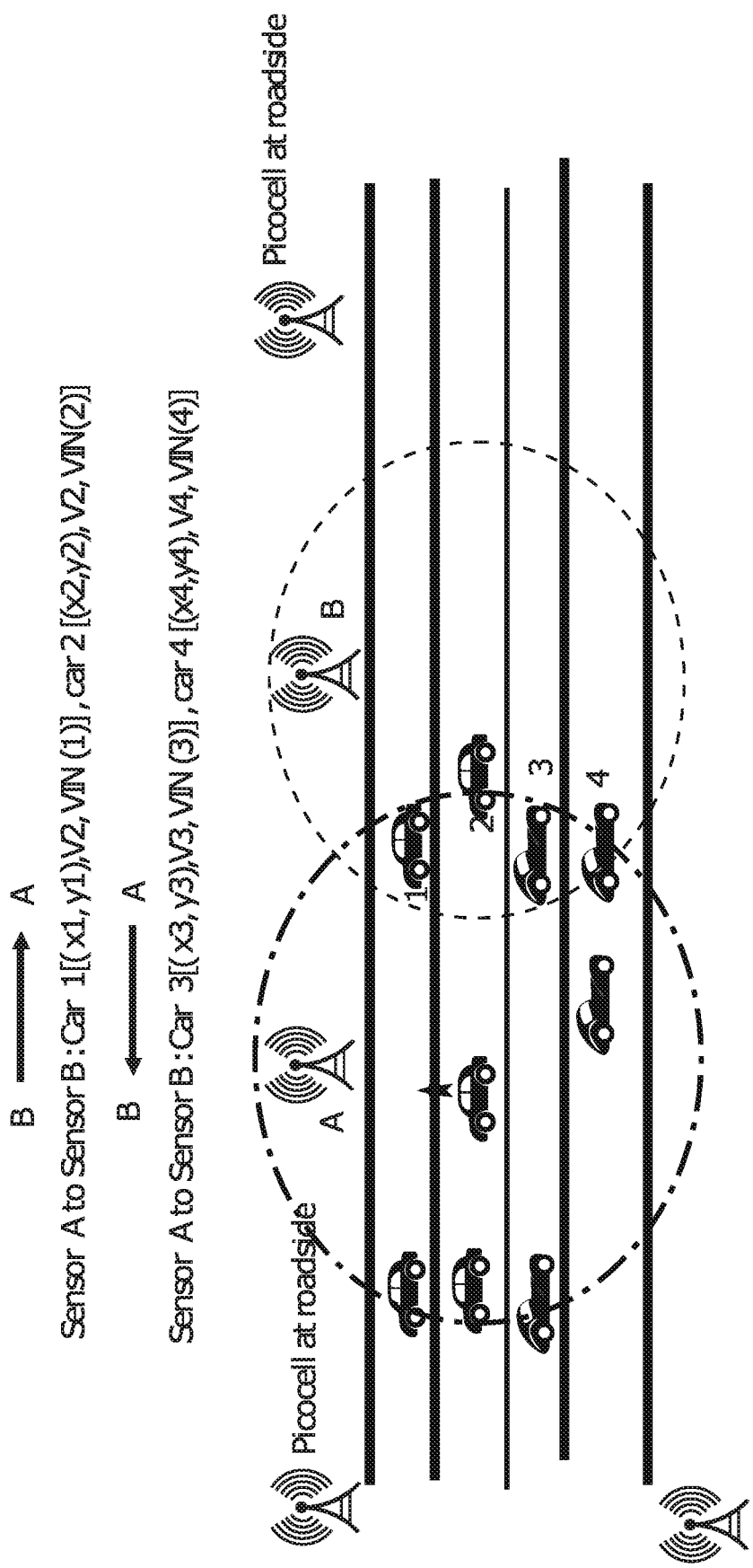
FIG. 3 is an illustration of utilizing the present invention to track the spatial positioning data of the vehicle along a road.
Figure 14:
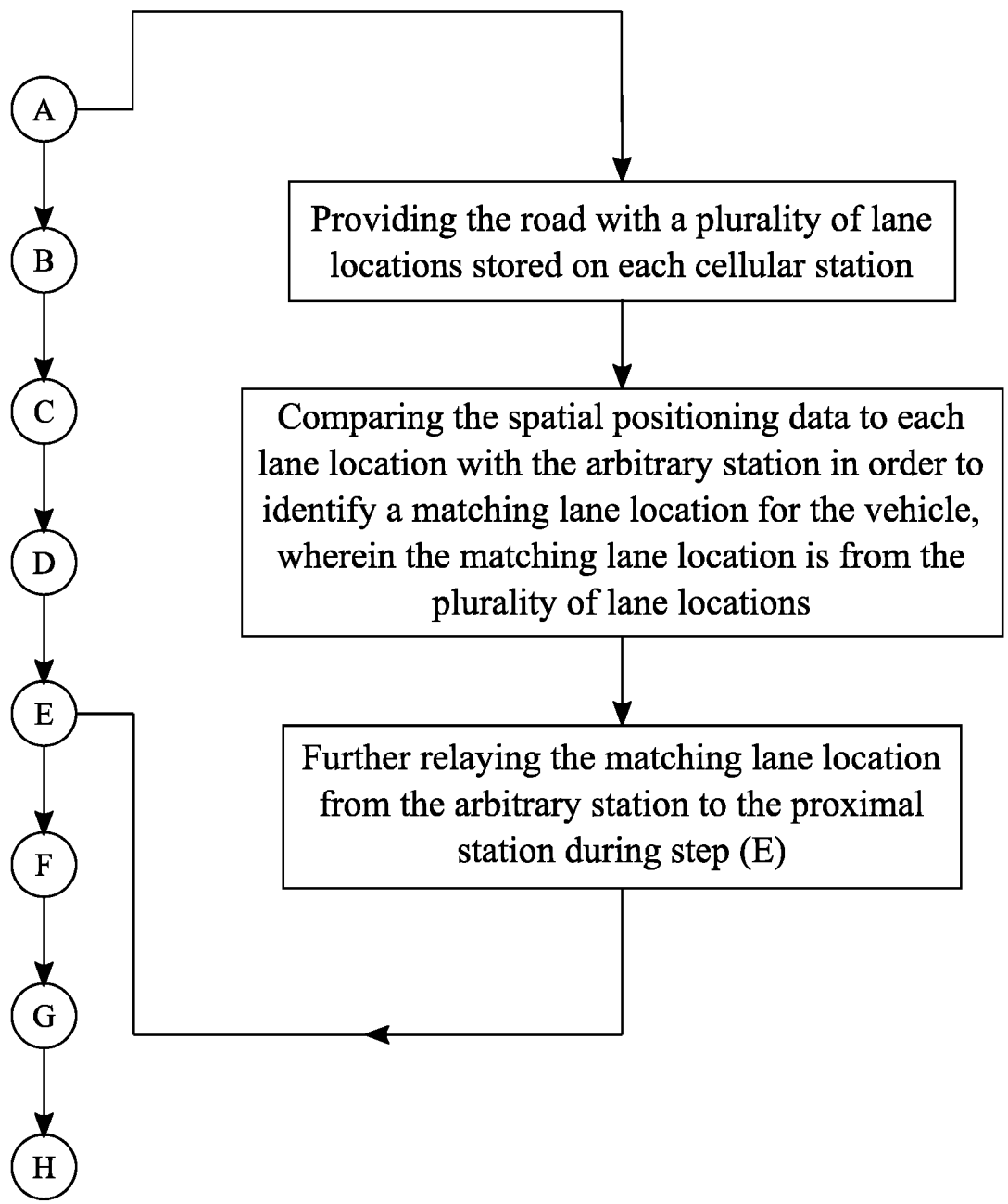
FIG. 14 is a flowchart illustrating the subprocess of associating a specific lane for a vehicle of the present invention of which the vehicle is currently driving on and monitoring which lanes the vehicle is driving on along the path of the vehicle.
Figure 15:
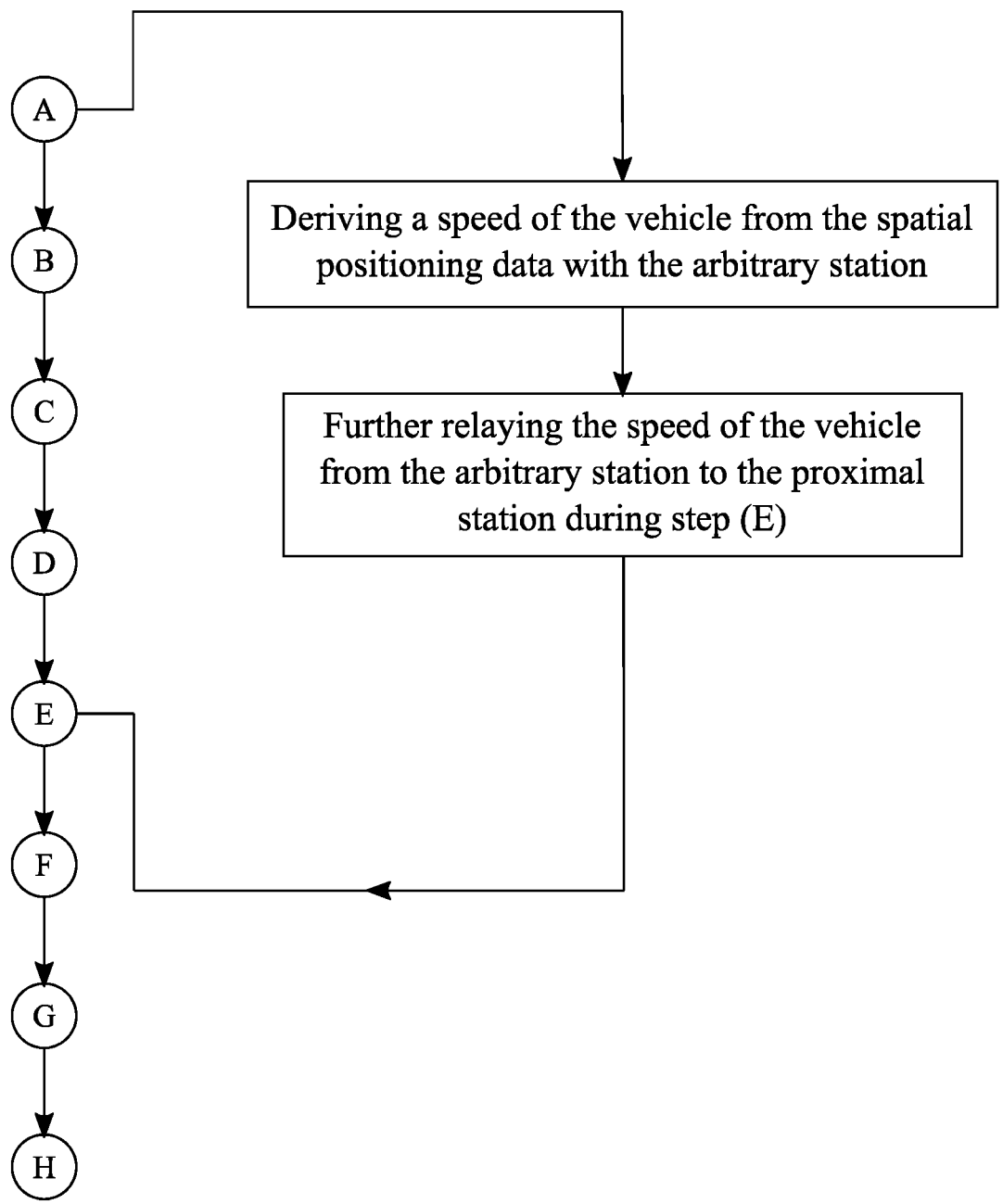
FIG. 15 is a flowchart illustrating the subprocess of monitoring the speed of the vehicle as the vehicle passes each cellular station of the present invention.

In order for multiple samples to be provided for the plurality of stations to accurately determine the predicted path of the vehicle, the spatial positioning data for a vehicle is taken not only near the plurality of road hazards but throughout the entire current path taken by the vehicle. As seen in FIG. 3, the road is provided with a plurality of lane locations stored on each cellular station, in order to better determine the driving habits of the vehicle, seen in FIG. 14. The spatial positioning data is compared to each lane location with the arbitrary station in order to identify a matching lane location for the vehicle, wherein the matching lane location is from the plurality of lane locations. The matching lane location is further relayed from the arbitrary station to the proximal station during Step F, associating the matching lane location with the vehicle. Moreover, as seen in FIG. 15, a speed of the vehicle is derived from the spatial positioning data with the arbitrary station, and the speed of the vehicle is further relayed from the arbitrary station to the proximal station, providing additional samples for the predicted path of the vehicle. Once the vehicle approaches a road hazard, the predicted path of the vehicle is then accurately determined, and the vehicle is notified as at least one specific station from the plurality of cellular stations is located adjacent to at least one specific hazard from the plurality of road hazards.

Figure 6:
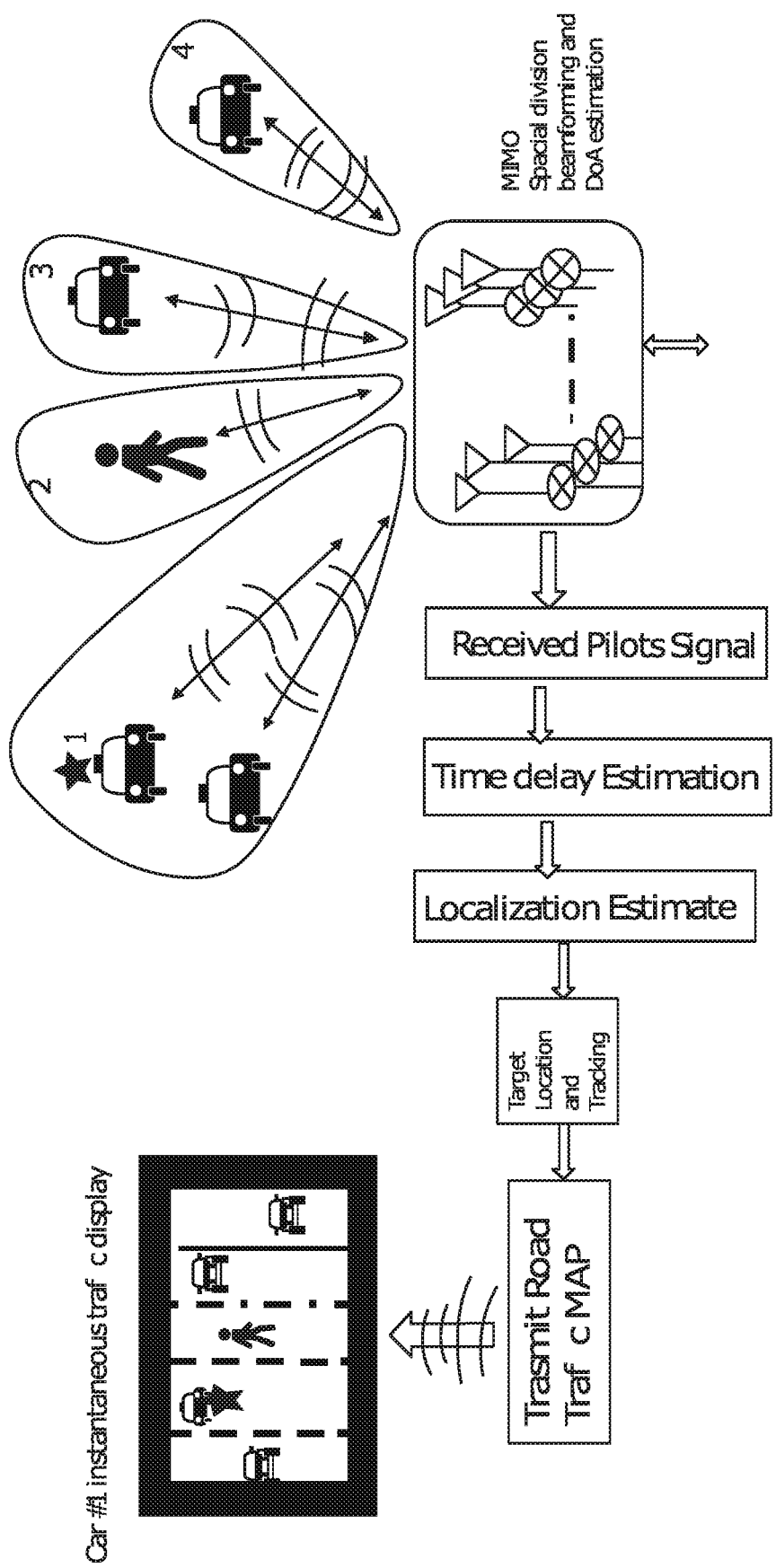
FIG. 6 is an illustration of utilizing a $V_2V$ network to account for time delay between a plurality of vehicles and a cellular station the present invention.
Figure 16:
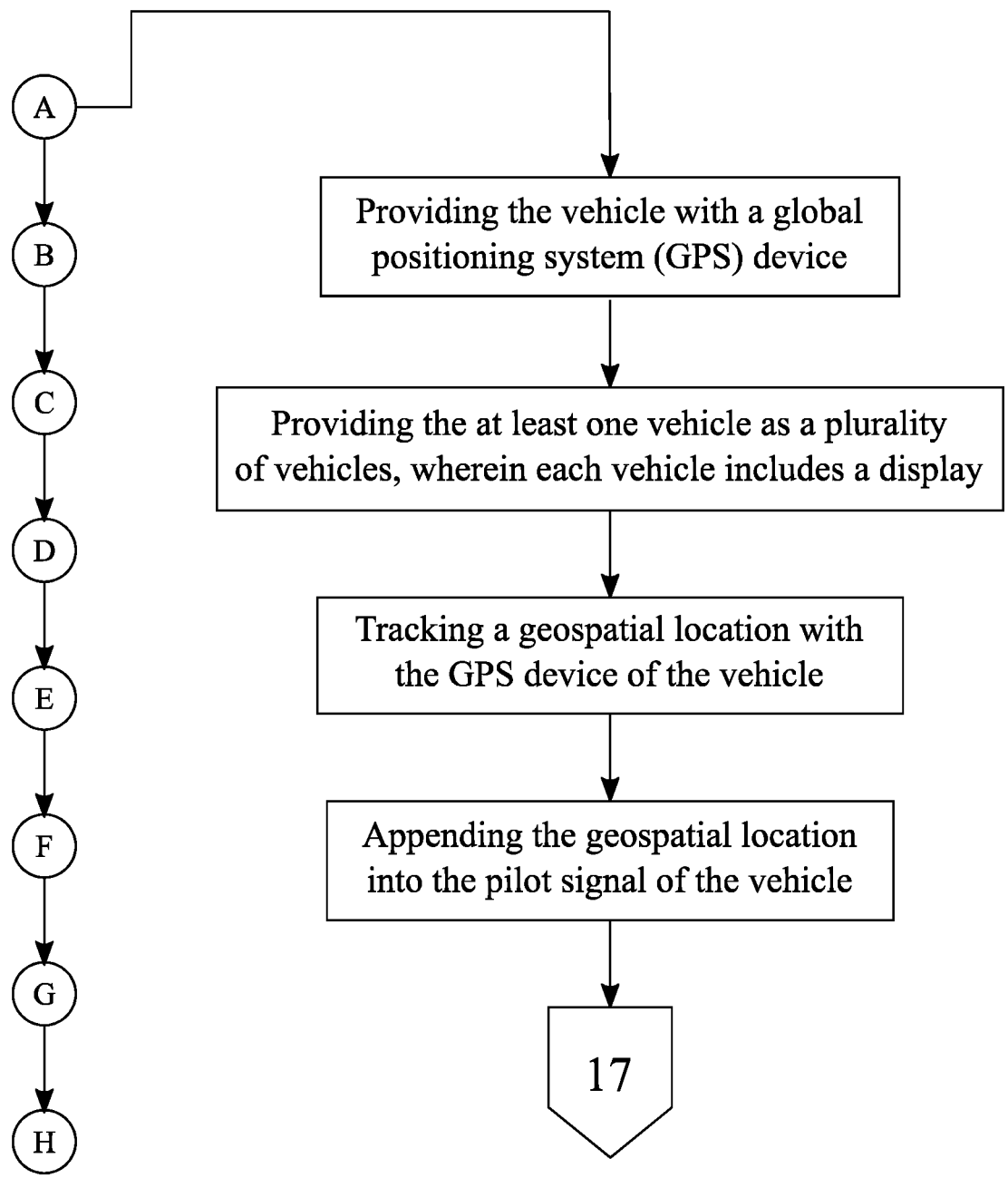
FIG. 16 is a flowchart illustrating the subprocess of verifying the spatial positioning data by utilizing a global positioning system (GPS) device of a vehicle.
Figure 17:
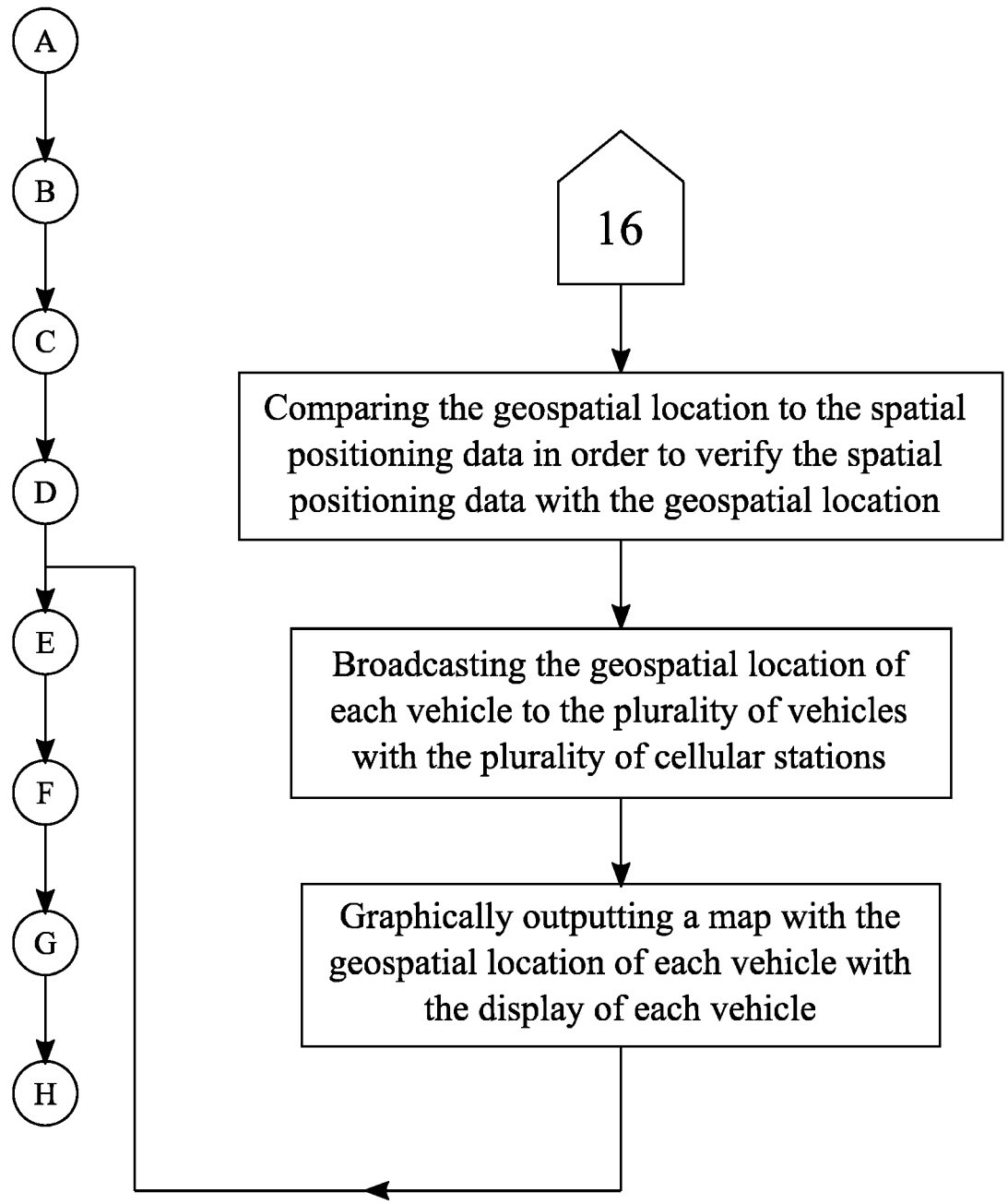
FIG. 17 is a flowchart illustrating the subprocess of graphically outputting a map with a path of a vehicle and a path of each vehicle within a range of the vehicle.

A driver of the vehicle may view the spatial positioning data in real-time as the vehicle is provided with a global positioning system (GPS) device, and a geospatial location is tracked with the GPS device of the vehicle, seen in FIG. 16. In order to receive the real-time location of the vehicle, the geospatial location is appended into the pilot signal of the vehicle. The geospatial location is then compared to the spatial positioning data with the arbitrary station in order to verify the spatial positioning data with the geospatial location, each cellular station therefore receives and transmits the spatial positioning data, seen in FIG. 17. Furthermore, the at least one vehicle is provided as a plurality of vehicles, wherein each vehicle includes a display so that the driver of a vehicle is not only able to view the corresponding vehicle, but surrounding vehicles as well. The geospatial location of each vehicle is broadcasted to the plurality of vehicles with the plurality of cellular stations, and a map is graphically outputted with the geospatial location of each vehicle with the display of each vehicle, seen in FIG. 5 and FIG. 6.

Although the invention has been explained in relation to its preferred embodiment, it is to be understood that many other possible modifications and variations can be made without departing from the spirit and scope of the invention as hereinafter claimed.

What is claimed is:

1. A method of vehicle-tracking and localization with a distributed sensor network, the method comprises the steps of:
    (A) providing a plurality of cellular stations, wherein the plurality of cellular stations is distributed along at least one road and is communicably coupled to each other, and wherein a plurality of vehicle profiles and a plurality of road hazards are stored on each cellular station, and wherein at least one vehicle is driving along the road;
    (B) receiving a pilot signal from the vehicle with an arbitrary station, wherein the arbitrary station is any station from the plurality of cellular stations;
    (C) comparing the pilot signal to each vehicle profile with the arbitrary station in order to identify a matching profile from the plurality of vehicle profiles;
    (D) receiving spatial positioning data for the vehicle with the arbitrary station;
    (E) relaying the vehicle profile and the spatial positioning data from the arbitrary station to at least one proximal station from the plurality of cellular stations, wherein the proximal station is geospatially closer to the arbitrary station than remaining stations from the plurality of cellular stations;
    (F) executing a plurality of iterations for step (B) through (E), wherein the proximal station for a previous iteration from the plurality of iterations is the arbitrary station for a current iteration from the plurality of iterations;
    (G) compiling the spatial positioning data from each iteration into a predicted path for the vehicle with the cellular stations; and,
    (H) sending a warning notification from the arbitrary station of the current iteration to the vehicle, when the predicted path is intersected by at least one hazard from the plurality of road hazards.

2. The method of vehicle-tracking and localization with a distributed sensor network, the method as claimed in claim 1, wherein each cellular station is a picocell station.

3. The method of vehicle-tracking and localization with a distributed sensor network, the method as claimed in claim 1, wherein each cellular station is a node within a cellular communication network.

4. The method of vehicle-tracking and localization with a distributed sensor network, the method as claimed in claim 1, wherein each cellular station is a node within a local communication network.

5. The method of vehicle-tracking and localization with a distributed sensor network, the method as claimed in claim 1 comprises the step of:
    terminating each iteration after the vehicle moves from a detection range of the arbitrary station into a detection range of the proximal station during step (F).

6. The method of vehicle-tracking and localization with a distributed sensor network, the method as claimed in claim 1, wherein a detection range of each cellular station ranges from 100 meters to 500 meters.

7. The method of vehicle-tracking and localization with a distributed sensor network, the method as claimed in claim 1 comprises the steps of:
    providing a multiple-input and multiple-output (MIMO) antenna for each cellular station;
    outputting and receiving a signature beam with the MIMO antenna of the arbitrary station;
    extracting a direction of arrival (DoA) estimation and a time-delay estimation from the signature beam with the arbitrary station; and,
    deriving the spatial positioning data from a combination of the DoA estimation and the time-delay estimation with the arbitrary station during step (D).

8. The method of vehicle-tracking and localization with a distributed sensor network, the method as claimed in claim 7 comprises the step of:
    tracking operational data with the MIMO antenna of the arbitrary station for each iteration;
    comparing the operational data for each iteration among each other with the arbitrary station in order to identify at least one shared identifier amongst the operational data for each iteration; and,
    configuring the signature beam of the arbitrary station in accordance to the shared identifier.

9. The method of vehicle-tracking and localization with a distributed sensor network, the method as claimed in claim 1 comprises the steps of:
    providing the at least one vehicle as a first vehicle and a second vehicle;
    executing the plurality of iterations with the first vehicle in order to compile the predicted path of the first vehicle;
    executing the plurality of iterations with the second vehicle in order to compile the predicted path of the second vehicle; and,
    sending a collision notification to the first vehicle and the second vehicle, if when the predicted path of the first vehicle and the predicted path of the second vehicle intersect each other.

10. The method of vehicle-tracking and localization with a distributed sensor network, the method as claimed in claim 1 comprises the steps of:
    providing the road with a plurality of lane locations stored on each cellular station;
    comparing the spatial positioning data to each lane location with the arbitrary station in order to identify a matching lane location for the vehicle, wherein the matching lane location is from the plurality of lane locations; and,
    further relaying the matching lane location from the arbitrary station to the proximal station during step (E).

11. The method of vehicle-tracking and localization with a distributed sensor network, the method as claimed in claim 1 comprises the steps of:

deriving a speed of the vehicle from the spatial positioning data with the arbitrary station; and, further relaying the speed of the vehicle from the arbitrary station to the proximal station during step (E).

12. The method of vehicle-tracking and localization with a distributed sensor network, the method as claimed in claim 1, wherein at least one specific station from the plurality of cellular stations is located adjacent to at least one specific hazard from the plurality of road hazards.

13. The method of vehicle-tracking and localization with a distributed sensor network, the method as claimed in claim 1 comprises the steps of:

providing the vehicle with a global positioning system (GPS) device;

tracking a geospatial location with the GPS device of the vehicle;

appending the geospatial location into the pilot signal of the vehicle; and, comparing the geospatial location to the spatial positioning data with the arbitrary station in order to verify the spatial positioning data with the geospatial location.

14. The method of vehicle-tracking and localization with a distributed sensor network, the method as claimed in claim 13 comprises the steps of:

providing the at least one vehicle as a plurality of vehicles, wherein each vehicle includes a display;

broadcasting the geospatial location of each vehicle to the plurality of vehicles with the plurality of cellular stations; and, graphically outputting a map with the geospatial location of each vehicle with the display of each vehicle.

* * * * *